United States Patent
Nguyen et al.

(10) Patent No.: US 10,701,534 B2
(45) Date of Patent: Jun. 30, 2020

(54) MESSAGE RELAYING IN VEHICLE-TO-VEHICLE COMMUNICATION SYSTEM

(71) Applicants: NXP B.V., Eindhoven (NL); NANYANG TECHNOLOGICAL UNIVERSITY, Singapore (SG)

(72) Inventors: Thanh Hieu Nguyen, Singapore (SG); Md Noor-A-Rahim, Singapore (SG); Yong Liang Guan, Singapore (SG); Hong Li, Veldhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/049,769

(22) Filed: Jul. 30, 2018

(65) Prior Publication Data
US 2020/0037131 A1 Jan. 30, 2020

(51) Int. Cl.
*H04W 4/46* (2018.01)
*H04B 7/14* (2006.01)
(Continued)

(52) U.S. Cl.
CPC ............... *H04W 4/46* (2018.02); *H04B 7/14* (2013.01); *H04W 16/28* (2013.01); *H04W 84/12* (2013.01)

(58) Field of Classification Search
CPC ....... H04W 4/46; H04W 16/28; H04W 84/12; H04B 7/14
See application file for complete search history.

(56) References Cited

U.S. PATENT DOCUMENTS

| | | |
|---|---|---|
| 7,352,291 B2 | 4/2008 | Reumerman |
| 8,923,147 B2 | 12/2014 | Krishnaswamy et al. |

(Continued)

FOREIGN PATENT DOCUMENTS

| | | | |
|---|---|---|---|
| EP | 1 784 032 A1 | | 5/2007 |
| KR | 20140074783 A | * | 6/2014 |

(Continued)

OTHER PUBLICATIONS

"IEEE standard for information technology—local and metropolitan area networks—specific requirements—part 11: Wireless LAN medium access control (MAC) and physical layer (PHY) specifications amendment 6: Wireless access in vehicular environments," pp. 1-51, Jul. 2010.

(Continued)

*Primary Examiner* — Candal Elpenord
(74) *Attorney, Agent, or Firm* — Rajeev Madnawat

(57) ABSTRACT

In a vehicle-to-vehicle communication system, an intersection-located road side unit (RSU) having two omni-antennas applies spatial filtering to the antennas' RX signals to recover first and second overlapping basic safety messages (BSMs) concurrently transmitted by two intersection-approaching vehicles that have no direct line of sight (NLOS) between them. The RSU retransmits each BSM for receipt by the other vehicle using either an omnidirectional retransmission technique in which the two messages are sequentially transmitted using an omnidirectional beam-pattern, a directional retransmission technique in which the two messages are sequentially transmitted using directional beam-patterns, or an XOR retransmission technique in which the RSU applies an XOR operation to the two BSMs and transmits the resulting XOR message using an omnidirectional beam-pattern. A receiving vehicle can apply an XOR (Continued)

operation to the XOR message and a local copy of the first BSM message to recover the second BSM message.

34 Claims, 4 Drawing Sheets

(51) Int. Cl.
*H04W 16/28* (2009.01)
*H04W 84/12* (2009.01)

(56) References Cited

U.S. PATENT DOCUMENTS

| | | |
|---|---|---|
| 9,843,550 B2 | 12/2017 | Hosie et al. |
| 2007/0088464 A1 | 4/2007 | Coates |
| 2007/0121521 A1 | 5/2007 | D Amico et al. |
| 2012/0213173 A1 | 8/2012 | Malladi et al. |
| 2016/0036499 A1* | 2/2016 | Burchard ............... H04B 7/026 375/267 |
| 2016/0150451 A1* | 5/2016 | Barreto De Miranda Sargento .... H04W 36/14 370/332 |
| 2017/0086081 A1* | 3/2017 | Kim ...................... H04W 4/027 |
| 2017/0325221 A1* | 11/2017 | Jalali .................. H04B 7/18502 |
| 2018/0047284 A1* | 2/2018 | Narasimha ........... G08G 1/0112 |
| 2018/0188745 A1* | 7/2018 | Pilkington ........... G05D 1/0295 |
| 2018/0343605 A1* | 11/2018 | Wu ......................... H04W 4/46 |
| 2019/0306909 A1* | 10/2019 | Zhou ..................... H04W 76/19 |

FOREIGN PATENT DOCUMENTS

| | | |
|---|---|---|
| WO | 98/11626 | 3/1998 |
| WO | 2017/036510 A1 | 3/2017 |

OTHER PUBLICATIONS

Intelligent Transport Systems (ITS); Vehicular Communications; Basic Set of Applications; Part 2: Specification of Cooperative Awareness Basic Service, ETSI Std., Rev. V1.3.0 Draft, 2013.

Dedicated Short Range Communications (DSRC) Message Set Dictionary, Society of Automotive Engineers, DSRC Committee Std. SAE J2735, 2009.

Noor-A-Rahim, M. et al. "Performance Analysis of IEEE 802.11p Safety Message Broadcast With and Without Relaying at Road Intersection" IEEE Access (vol. 6) pp. 23786-23799 (Apr. 2018).

* cited by examiner

500

MESSAGE RELAYING IN VEHICLE-TO-VEHICLE COMMUNICATION SYSTEM

BACKGROUND

The present invention relates to vehicle-to-vehicle (V2V) communications systems, and, more particularly, to message relaying using road side units (RSUs) in such systems.

In V2V communications systems that conform to the IEEE 802.11p standard, vehicles transmit basic safety messages (BSMs) to inform other vehicles of their current location, heading, and speed in order to avoid accidents. RSUs are used in V2V communication systems to relay messages between vehicles that do not have a direct line-of-sight (LOS) between them. Such RSUs are provisioned with two omnidirectional (omni) antennas that are located as far apart as possible in order to enable reception diversity at the RSU. Such omni-antennas are separated by a distance equal to multiples of the signal wavelength used to transmit the messages. For systems conforming to the IEEE 802.11p standard, the signal wavelength is in the range of about 5.06 cm to about 5.12 cm, so the two antennas are typically tens of cm apart in a conventional RSU.

It would be advantageous to have an efficient circuit to transmit and decode BSMs transmitted by RSUs.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One aspect of the present invention is a road side unit (RSU) for a vehicle-to-vehicle (V2V) communication system. The RSU comprises first and second antennas that both concurrently receive a first message from a first vehicle and a second message from a second vehicle and generate respective first and second receive (RX) signals; and a signal processor that performs spatial filtering to recover (i) the first message from the first and second RX signals using a first directional beam-pattern and (ii) the second message from the first and second RX signals using a second directional beam-pattern that is not parallel to the first directional beam-pattern. The signal processor generates at least a first transmit (TX) signal for the first antenna to enable the second vehicle to receive the first message and the first vehicle to receive the second message.

Another aspect of the present invention is an onboard unit (OBU) for a V2V communication system. The OBU comprises an antenna that generates RX signals and a transceiver that receives the RX signals from the antenna. The transceiver recovers, from the RX signals, a first message from a first vehicle, and an XOR message from an RSU; and the transceiver performs an XOR operation on the XOR message based on the first message to recover a second message from a second vehicle.

Figure 1:
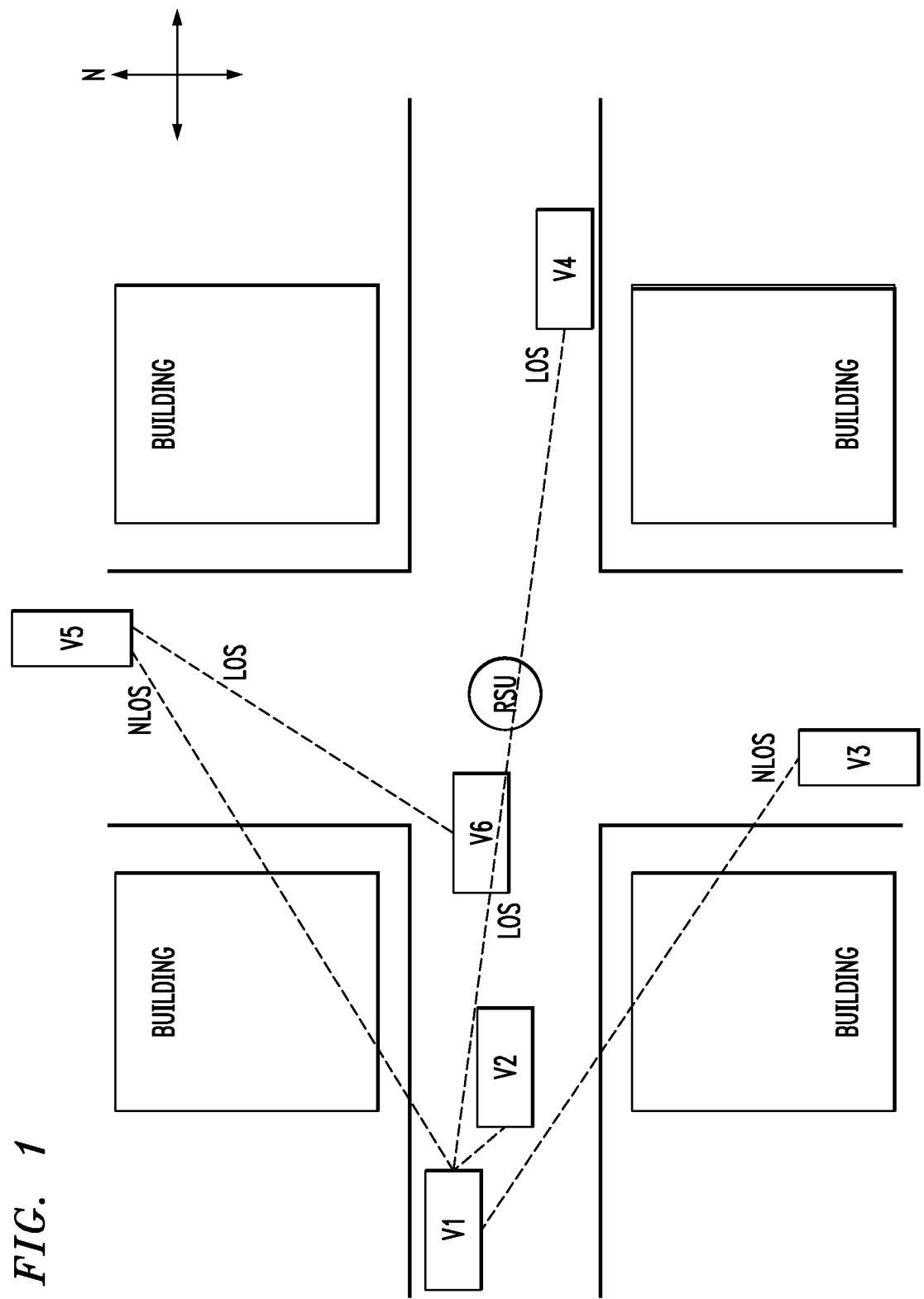
FIG. 1 is a schematic diagram of an orthogonal, four-way intersection.

FIG. 1 is a schematic representation of an orthogonal, four-way intersection between a first street running in the east-west (EW) direction and a second street running in the north-south (NS) direction where there are four vehicles V1, V2, V4, and V6 traveling towards the intersection on the EW street and two vehicles V3 and V5 traveling towards the intersection on the NS street.

According to the IEEE 802.11p standard, each conforming vehicle has a dedicated short-range communications (DSRC) onboard unit (OBU) with an omni-antenna that intermittently transmits a basic safety message (BSM) indicating its identity and current location, heading, and speed. In order to avoid packet collisions, each vehicle's OBU monitors the appropriate wireless transmission link to determine if another vehicle's OBU is already transmitting a BSM. When the link is quiet, each OBU with a BSM to transmit will wait for a randomly selected back-off duration before deciding to begin transmitting its BSM, but only if the link is still quiet.

As indicated in FIG. 1, located at all four corners of the intersection are high-rise buildings that block some of the vehicles from having direct lines of sight (LOS) to each other. For example, vehicle V1 has a direct LOS to each of vehicles V2, V4, and V6, but not to vehicles V3 and V5 due to the intervening buildings. Thus, vehicle V1 has "no direct line of sight" (NLOS) to vehicles V3 and V5.

Since there is NLOS between vehicles V1 and V3, there is no guarantee that V3 will receive a BSM transmitted by V1. Similarly, there is no guarantee that V5 will receive V1's BSM. By the same token, there is no guarantee that V1 will receive either V3's or V5's BSMs. Although not indicated in FIG. 1, there are other pairs of vehicles with NLOS between them, such as vehicles V3 and V4 and vehicles V4 and V5.

To enable pairs of vehicles that have NLOS between them to exchange BSMs, the center of the intersection includes a road side unit (RSU). For example, the RSU may be mounted above the surface of the intersection such as on a support structure for a traffic light. Since the RSU has a direct LOS with each of the six vehicles V1-V6, the RSU receives all of the BSMs transmitted by vehicles V1-V6. The RSU uses at least the identity, location, and heading information in the received BSMs, along with pre-programmed information about the configurations of the buildings at the four corners of the intersection, to identify (using straight-forward geometry) pairs of vehicles that have NLOSs between them. As explained further below, in some implementations, the BSM also uses speed information from the BSMs in its processing.

Knowing which pairs of vehicles have NLOSs between them enables the RSU to identify BSMs that need to be retransmitted. For example, the RSU will determine that V1 and V3 have NLOS between them and that V1 and V5 also have NLOS between them, so the RSU will determine that it must retransmit a BSM received from V1 so that V3 and V5 will receive V1's BSM. By the same token, the RSU knows that it must retransmit V3's and V5's BSMs so that V1 will receive them.

Furthermore, because V1 and V3 have NLOS between them, V1 and V3 may end up transmitting their respective BSMs concurrently because they may each misinterpret a quiet communication link as indicating freedom to transmit.

In that case, the RSU will receive two overlapping (in time) BSMs from two different vehicles. Note that, for the orthogonal, four-way intersection of FIG. 1, since each vehicle has a direct LOS with at least those vehicles currently located on the same street and will therefore not transmit a BSM if any other vehicle on its street is already transmitting a BSM, no more than two vehicles will ever transmit overlapping BSMs.

To address the problem of overlapping BSMs, in one embodiment, the RSU has two omni-antennas and two receive (RX) filters that enable the RSU to receive and successfully recover two overlapping BSMs.

Figure 2:
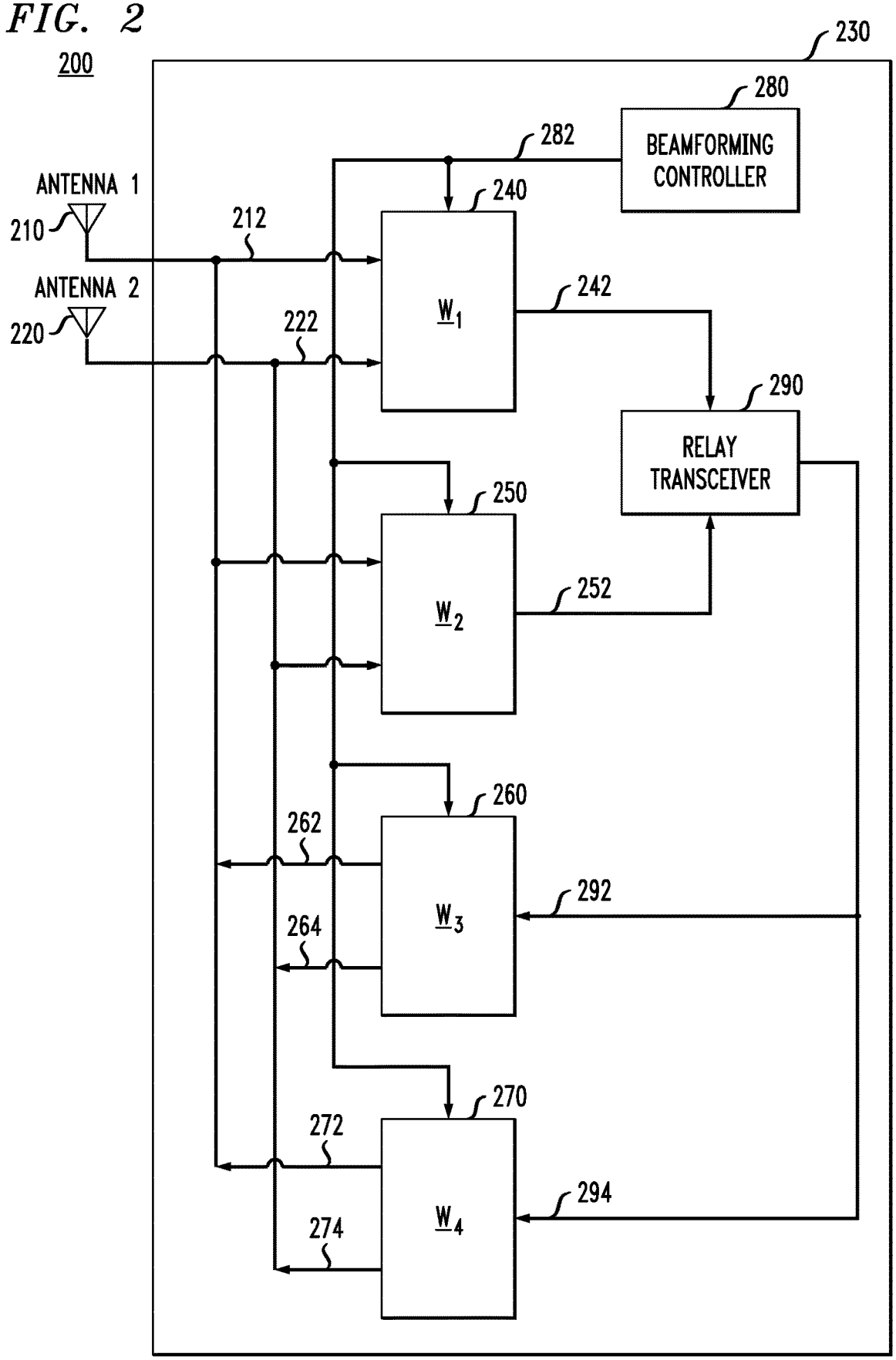
FIG. 2 is a schematic block diagram of a road side unit (RSU) for the intersection of FIG. 1 according to one embodiment of the present invention.

FIG. 2 is a schematic block diagram of an RSU 200 that can be used as the RSU of FIG. 1, according to one embodiment of the present invention. The RSU 200 includes first and second omni-antennas 210 and 220 and a signal processor 230 that receives first and second receive (RX) signals 212 and 222 from the antennas 210 and 220, and generates up to four transmit (TX) signals 262, 264, 272, and 274 for transmission by the antennas.

The signal processor 230 includes first and second receive (RX) filters 240 and 250, a first transmit (TX) filter 260, an (optional) second TX filter 270, a beamforming controller 280, and a relay transceiver 290. The beamforming controller 280 generates control signals 282 that specify weighting vectors $w_1$-$w_4$ respectively applied by the filters 240, 250, 260, and 270, as described further below. The relay transceiver 290 determines which BSMs to retransmit and generates appropriate outgoing signals 292 and 294 that are provided to the two TX filters 260 and 270 based on the BSMs selected for retransmission.

The first RX filter 240 receives the first and second RX signals 212 and 222 from the first and second antennas 210 and 220, and applies spatial filtering based on the first weighting vector $w_1$ to generate a first incoming beam-pattern signal 242 for the transceiver 290, such that:

$$b_1 = w_{11} r_1 + w_{12} r_2,$$

where:
  $b_1$ is the first incoming beam-pattern signal 242;
  $r_1$ is the first RX signal 212;
  $r_2$ is the second RX signal 222; and
  $w_1 = [w_{11}\ w_{12}]$.

Similarly, the second RX filter 250 receives the first and second RX signals 212 and 222 and applies spatial filtering based on the second weighting vector $w_2$ to generate a second incoming beam-pattern signal 252 for the transceiver 290, such that:

$$b_2 = w_{21} r_1 + w_{22} r_2,$$

where:
  $b_2$ is the second incoming beam-pattern signal 252; and
  $w_2 = [w_{21}\ w_{22}]$.

The first TX filter 260 receives the first outgoing signal 292 from the relay transceiver 290 and uses the third weighting vector $w_3$ to generate a first TX signal 262 for the first antenna 210 and a second TX signal 264 for the second antenna 220, such that:

$$y_1 = w_{31} s_1$$

$$y_2 = w_{32} s_1,$$

where:
  $y_1$ is the first TX signal 262;
  $y_2$ is the second TX signal 264;
  $s_1$ is the first transceiver outgoing signal 292; and
  $w_3 = [w_{31}\ w_{32}]$.

If the second TX filter 270 is included, the second TX filter 270 receives the second outgoing signal 294 from the relay transceiver 290 and uses the fourth weighting vector $w_4$ to generate a third TX signal 272 for the first antenna 210 and a fourth TX signal 274 for the second antenna 220, such that:

$$y_3 = w_{41} s_2$$

$$y_4 = w_{42} s_2,$$

where:
  $y_3$ is the third TX signal 272;
  $y_4$ is the fourth TX signal 274;
  $s_2$ is the second transceiver outgoing signal 294; and
  $w_4 = [w_{41}\ w_{42}]$.

In certain embodiments, the two omni-antennas 210 and 220 are separated by a distance that is substantially equal to one half the wavelength of the signals used to transmit the BSMs. In systems that conform to the IEEE 802.11p standard, the antennas 210 and 220 are separated by a distance in the range of about 2.53 cm to about 2.56 cm. In certain embodiments for orthogonal, four-way intersections, such as the intersection of FIG. 1, the two antennas 210 and 220 are oriented parallel to one of the two streets (i.e., either the EW street or the NS street in FIG. 1).

Based on the separation and orientation of the two antennas 210 and 220, the first and second weighting vectors $w_1$ and $w_2$ for the first and second RX filters 240 and 250 can be configured to achieve two different beam-patterns that are substantially mutually orthogonal to one another. The third weighting vector $w_3$ enables the first TX filter 260 to generate an omnidirectional beam-pattern. Alternatively, the third and fourth weighting vectors $w_3$ and $w_4$ enable the first and second TX filters 260 and 270 to achieve beam-patterns that are substantially mutually orthogonal to one another.

Figure 3:
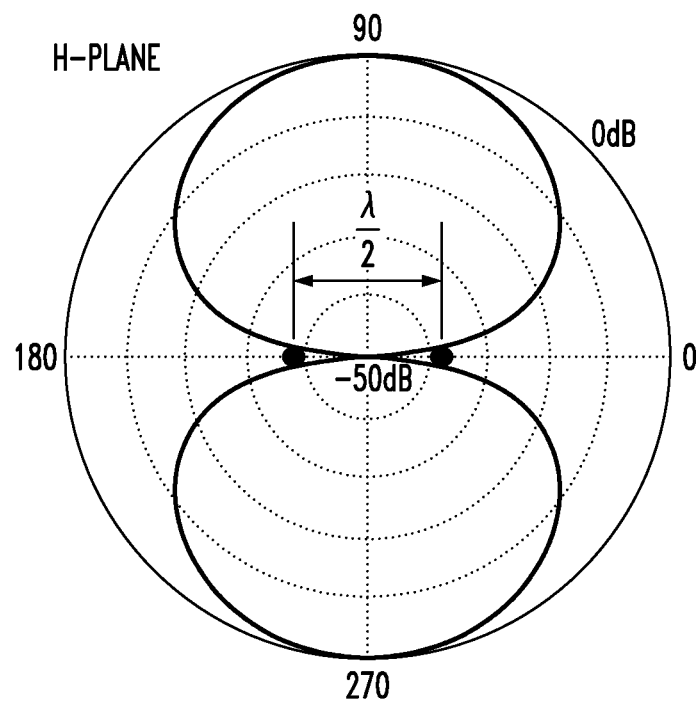
FIG. 3 is a graphic representation of a north-south beam-pattern for the intersection of FIG. 1.

FIG. 3 is a graphic representation of the beam-pattern in the horizontal (H) plane generated by the first RX filter 240 by setting $w_1 = [w_{11}\ w_{12}] = [1\ 1]$ when the two antennas 210 and 220 are oriented parallel to the EW street, where east is 0 degree, north is 90 degrees, west is 180 degrees, and south is 270 degrees. With its north and south look directions and nulls in the east and west directions, this beam-pattern will see BSMs transmitted by vehicles located on the NS street, but not BSMs transmitted by vehicles located on the EW street. Note that, alternatively, this same beam-pattern can be generated by the second RX filter 250 by setting $w_2 = [w_{21}\ w_{22}] = [1\ 1]$. Furthermore, this same beam-pattern can be generated by either the first TX filter 260 or the second TX filter 270 by setting its weighting vector to have the same values. In that case, the beam-pattern can be used to retransmit BSMs that will be seen only by vehicles on the NS street.

Figure 4:
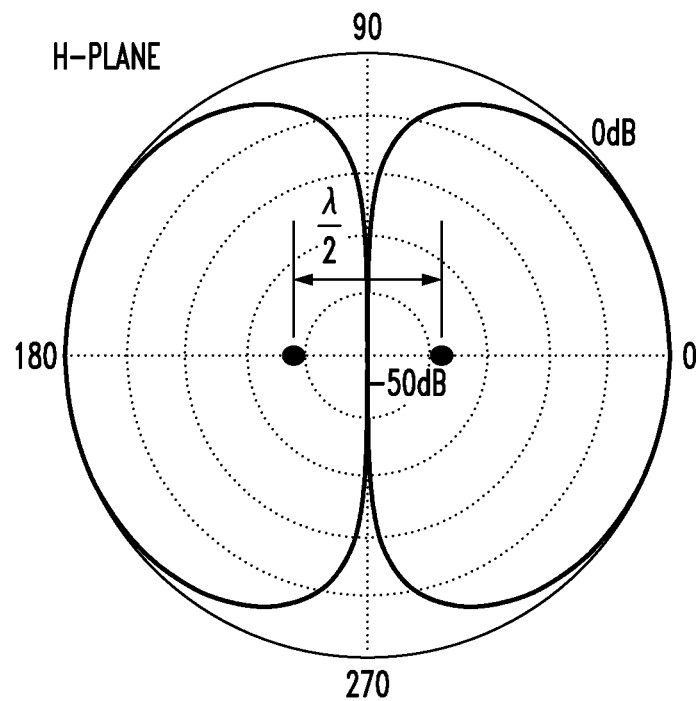
FIG. 4 is a graphic representation of an east-west beam-pattern for the intersection of FIG. 1.

FIG. 4 is a graphic representation of the beam-pattern in the H-plane generated by the second RX filter 250 by setting $w_2 = [w_{21}\ w_{22}] = [1\ -1]$ when the two antennas 210 and 220 are oriented parallel to the EW street. With its east and west look directions and nulls in the north and south directions, this beam-pattern will see BSMs transmitted by vehicles located on the EW street, but not BSMs transmitted by vehicles located on the NS street. Note that, alternatively, this same beam-pattern can be generated by the first RX filter 240 by setting $w_1 = [w_{11}\ w_{12}] = [1\ -1]$. Furthermore, this same beam-pattern can be generated by either the first TX filter 260 or the second TX filter 270 by setting its weighting vector to have the same values. In that case, the beam-pattern can be used to retransmit BSMs that will be seen only by vehicles on the EW street.

With the first and second RX filters 240 and 250 configured to generate the beam-patterns of FIGS. 3 and 4, the RSU 200 can recover two overlapping BSMs, where one BSM is transmitted by a vehicle on the NS street of FIG. 1, and the other BSM is transmitted by a vehicle on the EW street. For example, the RSU 200 can recover a BSM from vehicle V1 of FIG. 1 and a BSM from vehicle V3 of FIG. 1, even when these two vehicles transmit concurrently.

By appropriately configuring the first and second RX filters 240 and 250 as described above, the relay transceiver 290 is able to receive all of the BSMs from all of the vehicles. The relay transceiver 290 then processes the received BSMs to determine which BSMs need to be retransmitted so that they will be received by vehicles having NLOS with the corresponding transmitting vehicles.

The beamforming performed by the RX and TX filters 240, 250, 260, and 270 can be implemented, for example, using a software-defined radio (SDR) or a hardware-based phase shifting and combining circuit. Depending on the particular implementation, the RSU 200 can employ a number of different techniques to retransmit a BSM.

Omnidirectional Retransmission

In an omnidirectional retransmission technique, the RSU 200 retransmits a BSM using an omnidirectional beam-pattern. This can be achieved using the first TX filter 260 by setting $w_3=[w_{31}\ w_{32}]=[1\ 0]$ or $[0\ 1]$, such that the first outgoing signal 292 (containing the BSM) is transmitted by only the first omni-antenna 210 or only the second omni-antenna 220. Note further that, alternatively, the second TX filter 270 could be used to transmit the BSM in the second outgoing signal 294 by setting $w_4=[w_{41}\ w_{42}]=[1\ 0]$ or $[0\ 1]$. Either way, each vehicle will receive the retransmitted BSM.

Note that, if the RSU 200 recovers two overlapping BSMs, then the RSU 200 then will transmit the two BSMs sequentially to avoid overlap at the receiving vehicles, when performing the omnidirectional retransmission technique.

Directional Retransmission

In a directional retransmission technique, the RSU 200 retransmits a BSM using a directional beam-pattern. For example, if the BSM was received from a vehicle on the EW street of FIG. 1, then the RSU 200 can retransmit the BSM to vehicles located on the NS street using the beam-pattern of FIG. 3. This can be achieved using either the first TX filter 260 with $w_3=[w_{31}\ w_{32}]=[1\ 1]$ or the second TX filter 270 with $w_4=[w_{41}\ w_{42}]=[1\ 1]$.

If, on the other hand, the BSM was received from a vehicle on the NS street of FIG. 1, then the RSU 200 can retransmit the BSM to vehicles located on the EW street using the beam-pattern of FIG. 4. This can be achieved using either the first TX filter 260 with $w_3=[w_{31}\ w_{32}]=[1\ -1]$ or the second TX filter 270 with $w_4=[w_{41}\ w_{42}]=[1\ -1]$.

Note that, using the directional retransmission technique, the RSU 200 can retransmit two different BSMs sequentially by configuring the first TX filter 260 to have the beam-pattern of FIG. 3 and the second TX filter 270 to have the beam-pattern of FIG. 4, or vice versa. For example, the RSU 200 can sequentially retransmit V1's BSM using the beam-pattern of FIG. 3 and V3's BSM using the beam-pattern of FIG. 4, whether or not those two BSMs were overlapping when received by the RSU 200. When the RSU 200 transmits a BSM using a directional beam-pattern aligned with the EW street, then the transmission link may be available for a vehicle on the NS street to concurrently transmit its own BSM, and vice versa. As such, enabling the RSU 200 to transmit directionally on different streets can increase the availability of timeslots which can be used by OBUs on the vehicles.

XOR Retransmission

In an XOR retransmission technique, the RSU 200 combines first and second BSMs from different streets using a bit-wise logical exclusive-OR (XOR) operation to generate an XOR message that is transmitted from either only the first antenna 210 or only the second antenna 220 using an omnidirectional beam-pattern. The XOR message identifies the first and second vehicles that transmitted the corresponding first and second BSMs. A vehicle that receives the XOR message can recover the second BSM from the XOR message by applying another bit-wise XOR operation between the XOR message and a locally stored copy of the first BSM, or vice versa.

For example, the RSU 200 can generate an XOR message based on V1's BSM and V3's BSM, knowing that those two vehicles have NLOS between them. V1 can then recover V3's BSM from the received XOR message by performing an XOR operation between the XOR message and V1's (locally stored) BSM. Similarly, V3 can recover V1's BSM from its received copy of the same XOR message by performing an XOR operation between the XOR message and V3's (locally stored) BSM.

In addition, because V5 (which also has NLOS with V1) will have directly received V3's BSM from V3, V5 can also recover V1's BSM from its received copy of that same XOR message by performing an XOR operation between the XOR message and V5's locally stored copy of V3's BSM. In an analogous manner, V4 (which has NLOS with V3) can recover V3's BSM from its received copy of that same XOR message using V4's locally stored copy of V1's BSM. Note that V2 (which also has NLOS with V3) of FIG. 1 can also use its locally stored copy of V1's BSM to recover V3's BSM.

In an analogous manner, the RSU 200 can generate an analogous XOR message from V4's BSM and V5's BSM to enable V1 and V4 to recover V5's BSM and V3 and V5 to recover V4's BSM. Note that V2 (which also has NLOS with V5) can also use its locally stored copy of V4's BSM to recover V5's BSM. Note that, while the BSMs from V1, V3, V4, and V5 can be retransmitted using as few as two XOR messages, V2's BSM can be retransmitted using either the omnidirectional or the directional retransmission technique. In this way, XOR messages can be efficiently used to enable all pairs of vehicles having NLOS between them to recover each other's BSMs, thereby reducing timeslots used by the RSU 200 for retransmissions.

Figure 5:
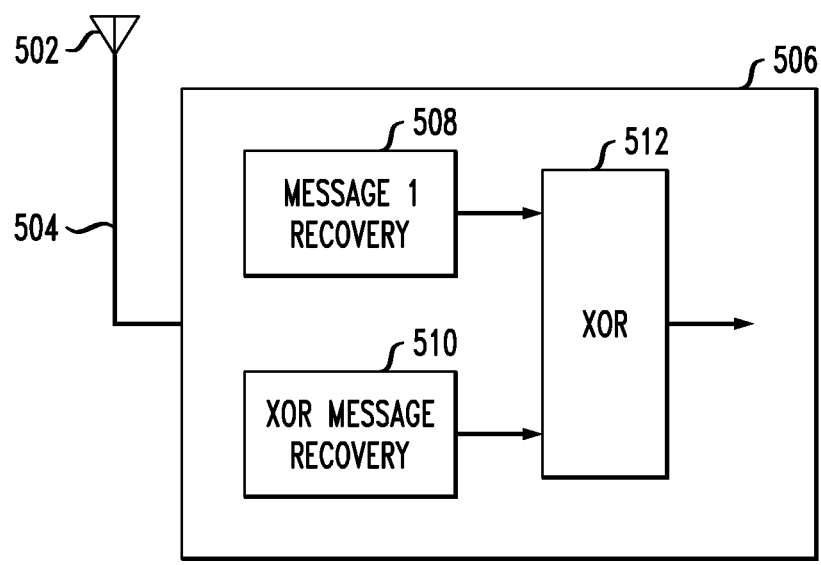
FIG. 5 is a schematic block diagram of an onboard unit (OBU) for each vehicle in FIG. 1, in accordance with an embodiment of the present invention.

FIG. 5 is a schematic block diagram of an onboard unit (OBU) 500 for vehicles, such as the vehicles V1-V6 of FIG. 1. The OBU 500 contains an omni-antenna 502 and a transceiver 506 connected by a hardwired signal path 504. The transceiver 506 generates (and stores) BSMs for transmission by the antenna 502 in a memory (not shown). In addition, the antenna 502 receives and the transceiver 506 processes and stores BSMs transmitted by other vehicles and XOR messages transmitted by an RSU, like the RSU 200 of FIG. 2. For an XOR message formed from first and second BSMs, if the transceiver 506 has a stored copy of the first BSM (whether the first BSM is its own BSM or a BSM received from another vehicle), then the transceiver 506 can perform an XOR operation between the XOR message and the first BSM to recover the second BSM, and vice versa. Accordingly, in one embodiment, the transceiver 506 includes a first message recovery module 508, a XOR message recovery unit 510, and a XOR gate 512. The transceiver 506 recovers, from the RX signals, a first message from a first vehicle using the module 508. The transceiver 506 recovers, from the RX signals, an XOR message from a Road Side Unit (RSU) using the XOR message recovery unit 510. Further, the transceiver 506 performs an XOR operation on the XOR message using the XOR gate 512, based on the first message, to recover a second message from a second vehicle.

Selective Relaying

The RSU 200 can reduce retransmissions even further by applying other criteria to the vehicles. For example, even though a first vehicle might not have a direct LOS with a second vehicle based on the geometry of an intersection, in some situations, the second vehicle may still be able to successfully receive a BSM from the first vehicle, and vice versa. For example, the BSM signals may sufficiently diffract around the edge of a building at the corner of an intersection to enable two vehicles having NLOS to receive each other's BSMs. The transceiver 290 of FIG. 2 can be configured to filter out such BSMs from being retransmitted by taking into account the relevant geometries. In one possible implementation, if, using a BSM's location information, the transceiver 290 determines that the transmitting vehicle is closer than a specified minimum threshold distance (e.g., 40 m) from the center of the intersection, then the transceiver 290 can ignore that BSM for its retransmission processing.

In addition or instead, the transceiver 290 can be configured to filter out BSMs from being retransmitted even if there is NLOS between two vehicles if at least one of the vehicles is sufficiently far away from the center of the intersection in distance. For example, if, using a BSM's location information, the transceiver 290 determines that the transmitting vehicle is farther than a specified maximum threshold distance (e.g., 150 m) from the center of the intersection, then the transceiver 290 can ignore that BSM for its retransmission processing.

In addition or instead, the transceiver 290 can be configured to filter out BSMs from being retransmitted even if there is NLOS between two vehicles if at least one of the vehicles is sufficiently far away from the center of the intersection in time. For example, if, using a BSM's location, heading, and speed information, the transceiver 290 determines that the transmitting vehicle is farther than a specified maximum threshold duration (e.g., about 3 sec) from the center of the intersection, then the transceiver 290 can ignore that BSM for its retransmission processing. Thus, even if the transceiver 290 determines that a first vehicle is relatively close in distance to the intersection (e.g., within 150 m), if the transceiver 290 determines that the first vehicle is moving sufficiently slowly or not moving at all, then the transceiver 290 can ignore that first vehicle's BSM in its retransmission processing. Note, however, that, if a second vehicle is traveling on the orthogonal street, the transceiver 290 may still determine to retransmit the second vehicle's BSM for receipt by the first vehicle.

Other aspects and advantages of the present invention will become apparent from the following description, taken in conjunction with the accompanying drawings, illustrating by way of example the principles of the invention.

Although the invention has been described in the context of particular weighting vectors and particular beam-patterns, those skilled in the art will understand that other suitable weighting vectors can be used to generate similar or alternative beam-patterns.

Although the invention has been described in the context of an RSU located at an intersection of two streets having BSM-obstructing buildings at one or more corners of the intersection, those skilled in the art will understand that the invention can be implemented in other suitable situations in which vehicles have NLOS between them, such as around curves with adjacent structures like buildings or hillsides that prevent direct LOSs.

Although the invention has been described in the context of an RSU having two omni-antennas that can generate substantially mutually orthogonal beam-patterns, those skilled in the art will understand that, in general, the invention can be implemented using two or more antennas, where zero, one, or more of the antennas are omni-antennas and the rest are directional (e.g., cardioid or hypercardioid) antennas, where, depending on their number, the antennas may be configured in one-, two-, or even three-dimensional patterns. In general, such RSUs may have two or more RX filters to process RX signals from the antennas and two or more TX filters generate TX signals for the antennas. Such RSUs may be able to achieve concurrent beamforming in two or more different directions.

Although the invention has been described in the context of basic safety messages (BSMs) of the IEEE 802.11p standard, those skilled in the art will understand that other suitable messages can be used, such as cooperative awareness messages (CAMs) of the IEEE 802.11p standard. Those skilled in the art also will understand that the invention is not limited to systems that conform to the IEEE 802.11p standard.

In some implementations, the RX filters 240 and 250 and the TX filter(s) 260 (and 270) have fixed beam-patterns. In those implementations, the beamforming controller 280 can be omitted. In some implementations, the RX filters 240 and 250 have fixed (e.g., directional) beam-patterns, but the TX filter(s) 260 (and 270) have controllable beam-patterns. In those implementations, the beamforming controller 280 controls weighting vectors for the TX filters, but not for the RX filters.

It should be apparent to those skilled in the art that the present invention may be embodied in many other specific forms without departing from the spirit or scope of the invention. Particularly, it should be understood that the present invention may be embodied in the following forms.

Embodiments of the invention can be manifest in the form of methods and apparatuses for practicing those methods, including in the form of program code embodied in tangible media, such as various types of memory devices, including memory connected to servers or local memories of processors, wherein, when the program code is loaded into and executed by a processor, the processor becomes an apparatus for practicing the invention. Any suitable processor-usable/readable or computer-usable/readable storage medium may be utilized. The storage medium may be (without limitation) an electronic, magnetic, optical, electromagnetic, infrared, or semiconductor system, apparatus, or device.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the terms "filter," "subsystem," "transceiver," and "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

Signals and corresponding terminals, nodes, ports, or paths may be referred to by the same name and are interchangeable for purposes here. For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present examples and embodiments are to be considered as illustrative and not restrictive, and the invention is not to be limited to the details given herein, but may be modified within the scope and equivalence of the appended claims.

The invention claimed is:

1. A road side unit (RSU) for a vehicle-to-vehicle (V2V) communication system, the RSU comprising:
   first and second antennas that both concurrently receive a first message from a first vehicle and a second message from a second vehicle and generate respective first and second receive (RX) signals, wherein the first and second antennas are both located at the RSU and are separated by a distance less than a signal wavelength of the first and second messages as received at the first and second antennas; and
   a signal processor that performs spatial filtering to recover (i) the first message from the first and second RX signals using a first directional beam-pattern and (ii) the second message from the first and second RX signals using a second directional beam-pattern that is not parallel to the first directional beam-pattern, wherein the signal processor generates at least a first transmit (TX) signal for the first antenna to enable the second vehicle to receive the first message and the first vehicle to receive the second message.

2. The RSU of claim 1, wherein the signal processor comprises:
   a first RX filter that combines the first and second RX signals based on the first directional beam-pattern to generate a first incoming beam-pattern signal;
   a second RX filter that combines the first and second RX signals based on the second directional beam-pattern to generate a second incoming beam-pattern signal;
   a transceiver that recovers (i) the first message from the first incoming beam-pattern signal and (ii) the second message from the second incoming beam-pattern signal, wherein:
     the transceiver determines that the first message is to be retransmitted for receipt by the second vehicle and that the second message is to be retransmitted for receipt by the first vehicle; and
     the transceiver generates at least a first outgoing signal based on at least the first message; and
   a first TX filter that generates at least the first TX signal for the first antenna based on the first outgoing signal.

3. The RSU of claim 2, wherein:
   the transceiver generates that first outgoing signal as an XOR message by combining the first and second messages using an XOR operation; and
   the first TX filter generates the first TX signal based on the first outgoing signal for the first antenna to transmit the XOR message in an omnidirectional beam-pattern.

4. The RSU of claim 3, wherein the first TX filter generates only the first TX signal for the first antenna based on the first outgoing signal in order to transmit the XOR message in the omnidirectional beam-pattern.

5. The RSU of claim 2, wherein:
   the transceiver initially generates an initial first outgoing signal based on the first message and the first TX filter generates only the first TX signal for the first antenna based on the initial first outgoing signal in order to transmit the first message in the omnidirectional beam-pattern; and
   the transceiver subsequently generates a subsequent first outgoing signal based on the second message and the first TX filter generates only the first TX signal for the first antenna based on the subsequent first outgoing signal in order to transmit the second message in the omnidirectional beam-pattern.

6. The RSU of claim 2, wherein the signal processor further comprises a second TX filter, wherein:
   the first TX filter generates, based on the first outgoing signal, (i) the first TX signal for the first antenna and (ii) a second TX signal for the second antenna;
   the second TX filter generates, based on the second outgoing signal, (i) a third TX signal for the first antenna and (ii) a fourth TX signal for the second antenna.

7. The RSU of claim 6, wherein the transceiver generates the first and second outgoing signals such that the first and second antennas transmit (i) the first message using the second directional beam-pattern and (ii) the second message using the first directional beam-pattern.

8. The RSU of claim 6, wherein:
   the transceiver generates the first outgoing signal for the first directional beam-pattern based on the second message, but not based on the first message; and
   the transceiver generates the second outgoing signal for the second directional beam-pattern based on the first message, but not based on the second message.

9. The RSU of claim 2, wherein the signal processor further comprises a beamforming controller that controls a beam-pattern applied by the first TX filter.

10. The RSU of claim 9, wherein the beamforming controller controls the first directional beam-pattern applied by the first RX filter and the second directional beam-pattern applied by the second RX filter.

11. The RSU of claim 1, wherein:
the first and second antennas are separated by a distance substantially equal to one half the signal wavelength of the first and second messages as received at the first and second antennas;
the first and second antennas are aligned along the first directional beam-pattern;
the first and second antennas are omnidirectional antennas; and
the first and second directional beam-patterns are mutually orthogonal.

12. The RSU of claim 1, wherein the RSU sequentially transmits the first and second messages in an omnidirectional beam-pattern.

13. The RSU of claim 1, wherein:
the RSU receives a third message from a third vehicle;
the signal processor determines that the third message from the third vehicle is to be retransmitted for receipt by a fourth vehicle if the signal processor determines that the fourth vehicle cannot reliably receive the third message directly from the third vehicle; and
the signal processor determines that the third message from the third vehicle is not to be retransmitted for receipt by the fourth vehicle if the signal processor determines that the fourth vehicle can reliably receive the third message directly from the third vehicle.

14. The RSU of claim 13, wherein the signal processor determines that the fourth vehicle cannot reliably receive the third message directly from the third vehicle based on the signal processor's knowledge of the current locations of the third and fourth vehicles and knowledge of adjacent structures that prevent direct line of sight between the third and fourth vehicles.

15. The RSU of claim 13, wherein the signal processor determines not to retransmit the third message based on the signal processor determining that the third vehicle is not located greater than a minimum threshold distance from the RSU and less than a maximum threshold distance from the RSU.

16. The RSU of claim 13, wherein the signal processor determines not to retransmit the third message based on the signal processor determining that the third vehicle is not located less than a maximum threshold duration from the RSU.

17. The RSU of claim 11, wherein each message is either a basic safety message (BSM) or a cooperative awareness message (CAM) conforming to an IEEE 802.11p standard.

18. The RSU of claim 1, wherein the first and second antennas are separated by a distance substantially equal to one half the signal wavelength of the first and second messages as received at the first and second antennas.

19. The RSU of claim 1, wherein the first and second antennas are separated by a distance of less than 5 cm.

20. The RSU of claim 19, wherein the first and second antennas are separated by a distance equal to about 2.5 cm.

21. The RSU of claim 1, wherein the signal processor generates a first outgoing signal as an XOR message by combining the first and second messages using an XOR operation and transmits the first outgoing signal using at least the first antenna.

22. A road side unit (RSU) for a vehicle-to-vehicle (V2V) communication system, the RSU comprising:
first and second antennas that both concurrently receive a first message from a first vehicle and a second message from a second vehicle and generate respective first and second receive (RX) signals; and
a signal processor that performs spatial filtering to recover (i) the first message from the first and second RX signals using a first directional beam-pattern and (ii) the second message from the first and second RX signals using a second directional beam-pattern that is not parallel to the first directional beam-pattern, wherein the signal processor generates at least a first transmit (TX) signal for the first antenna to enable the second vehicle to receive the first message and the first vehicle to receive the second message, wherein the signal processor comprises:
a first RX filter that combines the first and second RX signals based on the first directional beam-pattern to generate a first incoming beam-pattern signal;
a second RX filter that combines the first and second RX signals based on the second directional beam-pattern to generate a second incoming beam-pattern signal;
a transceiver that recovers (i) the first message from the first incoming beam-pattern signal and (ii) the second message from the second incoming beam-pattern signal, wherein:
the transceiver determines that the first message is to be retransmitted for receipt by the second vehicle and that the second message is to be retransmitted for receipt by the first vehicle; and
the transceiver generates at least a first outgoing signal based on at least the first message; and
a first TX filter that generates at least the first TX signal for the first antenna based on the first outgoing signal.

23. The RSU of claim 22, wherein:
the transceiver generates that first outgoing signal as an XOR message by combining the first and second messages using an XOR operation; and
the first TX filter generates the first TX signal based on the first outgoing signal for the first antenna to transmit the XOR message in an omnidirectional beam-pattern.

24. The RSU of claim 23, wherein the first TX filter generates only the first TX signal for the first antenna based on the first outgoing signal in order to transmit the XOR message in the omnidirectional beam-pattern.

25. The RSU of claim 22, wherein:
the transceiver initially generates an initial first outgoing signal based on the first message and the first TX filter generates only the first TX signal for the first antenna based on the initial first outgoing signal in order to transmit the first message in the omnidirectional beam-pattern; and
the transceiver subsequently generates a subsequent first outgoing signal based on the second message and the first TX filter generates only the first TX signal for the first antenna based on the subsequent first outgoing signal in order to transmit the second message in the omnidirectional beam-pattern.

26. The RSU of claim 22, wherein the signal processor further comprises a second TX filter, wherein:
the first TX filter generates, based on the first outgoing signal, (i) the first TX signal for the first antenna and (ii) a second TX signal for the second antenna;
the second TX filter generates, based on the second outgoing signal, (i) a third TX signal for the first antenna and (ii) a fourth TX signal for the second antenna.

27. The RSU of claim 26, wherein the transceiver generates the first and second outgoing signals such that the first and second antennas transmit (i) the first message using the second directional beam-pattern and (ii) the second message using the first directional beam-pattern.

28. The RSU of claim 26, wherein:
the transceiver generates the first outgoing signal for the first directional beam-pattern based on the second message, but not based on the first message; and
the transceiver generates the second outgoing signal for the second directional beam-pattern based on the first message, but not based on the second message.

29. The RSU of claim 22, wherein the signal processor further comprises a beamforming controller that controls a beam-pattern applied by the first TX filter.

30. The RSU of claim 29, wherein the beamforming controller controls the first directional beam-pattern applied by the first RX filter and the second directional beam-pattern applied by the second RX filter.

31. A road side unit (RSU) for a vehicle-to-vehicle (V2V) communication system, the RSU comprising:
first and second antennas that both concurrently receive a first message from a first vehicle and a second message from a second vehicle and generate respective first and second receive (RX) signals; and
a signal processor that performs spatial filtering to recover (i) the first message from the first and second RX signals using a first directional beam-pattern and (ii) the second message from the first and second RX signals using a second directional beam-pattern that is not parallel to the first directional beam-pattern, wherein:
the signal processor generates at least a first transmit (TX) signal for the first antenna to enable the second vehicle to receive the first message and the first vehicle to receive the second message;
the RSU receives a third message from a third vehicle;
the signal processor determines that the third message from the third vehicle is to be retransmitted for receipt by a fourth vehicle if the signal processor determines that the fourth vehicle cannot reliably receive the third message directly from the third vehicle; and
the signal processor determines that the third message from the third vehicle is not to be retransmitted for receipt by the fourth vehicle if the signal processor determines that the fourth vehicle can reliably receive the third message directly from the third vehicle.

32. The RSU of claim 31, wherein the signal processor determines that the fourth vehicle cannot reliably receive the third message directly from the third vehicle based on the signal processor's knowledge of the current locations of the third and fourth vehicles and knowledge of adjacent structures that prevent direct line of sight between the third and fourth vehicles.

33. The RSU of claim 31, wherein the signal processor determines not to retransmit the third message based on the signal processor determining that the third vehicle is not located greater than a minimum threshold distance from the RSU and less than a maximum threshold distance from the RSU.

34. The RSU of claim 31, wherein the signal processor determines not to retransmit the third message based on the signal processor determining that the third vehicle is not located less than a maximum threshold duration from the RSU.

* * * * *